(12) United States Patent
Froman et al.

(10) Patent No.: US 8,969,765 B2
(45) Date of Patent: Mar. 3, 2015

(54) ANTI-ICING SYSTEM FOR RADOMES

(75) Inventors: Gary S. Froman, Fort Worth, TX (US); Donavan Drewes, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 938 days.

(21) Appl. No.: 11/629,021

(22) PCT Filed: Dec. 9, 2004

(86) PCT No.: PCT/US2004/041266
§ 371 (c)(1),
(2), (4) Date: Dec. 8, 2006

(87) PCT Pub. No.: WO2006/001830
PCT Pub. Date: Jan. 5, 2006

(65) Prior Publication Data
US 2007/0295712 A1 Dec. 27, 2007

Related U.S. Application Data

(60) Provisional application No. 60/578,649, filed on Jun. 10, 2004.

(51) Int. Cl.
*H05B 11/00* (2006.01)
*B64D 15/22* (2006.01)
*B64D 15/14* (2006.01)

(52) U.S. Cl.
CPC ............... *B64D 15/22* (2013.01); *B64D 15/14* (2013.01)
USPC ..................................... 219/201; 244/134 E

(58) Field of Classification Search
CPC ........ B64D 15/00; B64D 15/12; B64D 15/14; B64D 15/16; B64D 15/18; B64D 15/20; B64D 15/22; H05B 1/00; H05B 1/02; H05B 3/00; H05B 3/84; G05D 23/00; G05D 23/02
USPC ............. 219/201, 209, 490, 492, 494; 244/134 A, 134 D, 134 R
See application file for complete search history.

(56) References Cited

U.S. PATENT DOCUMENTS 3,002,718 A    10/1961   Hackenberger
4,036,457 A *   7/1977   Volkner et al. ............ 244/134 D
(Continued)

FOREIGN PATENT DOCUMENTS

EP      0749894 A2   12/1996
EP      0855340 A2    7/1998
(Continued)

OTHER PUBLICATIONS

Supplementary European Search Report for related and copending European Application No. EP 04821783, May 5, 2009.
(Continued)

*Primary Examiner* — Brian Jennison
(74) *Attorney, Agent, or Firm* — James E. Walton; Damon R. Hickman

(57) ABSTRACT

An ice protection system for a structure has at least one electro-thermal heating element carried by the structure and a controller for selectively controlling the operation of each heating element. The controller operates each heating element according to a selected duty cycle defined by a pattern of time intervals, the controller selecting the duty cycle at least partially in response to measurements of ambient conditions about the structure.

35 Claims, 6 Drawing Sheets

(56) References Cited

U.S. PATENT DOCUMENTS

| | | | |
|---|---|---|---|
| 5,011,098 | A | 4/1991 | McLaren et al. |
| 5,354,015 | A | 10/1994 | Meador |
| 5,528,249 | A | 6/1996 | Gafford et al. |
| 5,691,736 | A * | 11/1997 | Hunn et al. .................... 343/872 |
| 5,709,470 | A * | 1/1998 | Finley ............................. 374/16 |
| 5,934,617 | A | 8/1999 | Rutherford |
| 6,129,314 | A * | 10/2000 | Giamati et al. ............ 244/134 R |
| 6,194,685 | B1 * | 2/2001 | Rutherford .................... 219/201 |
| 6,237,874 | B1 | 5/2001 | Rutherford et al. |
| 6,279,856 | B1 | 8/2001 | Rutherford et al. |
| 6,330,986 | B1 | 12/2001 | Rutherford et al. |
| 6,612,673 | B1 * | 9/2003 | Giere et al. ..................... 347/14 |
| 2002/0113060 | A1 * | 8/2002 | Sandhu .......................... 219/497 |
| 2003/0155467 | A1 * | 8/2003 | Petrenko .................. 244/134 R |

FOREIGN PATENT DOCUMENTS

| | | |
|---|---|---|
| JP | 3175510 | 7/1991 |
| WO | 88/09980 A1 | 12/1988 |
| WO | WO 88/09980 A1 | 12/1988 |

OTHER PUBLICATIONS

Canadian Office Action for related Canadian Application No. 2,569,053, dated Jan. 18, 2010.

Chinese Office Action for related Chinese Application No. 200480043308.9, dated Jul. 7, 2010.

Canadian Office Action for related Canadian Application No. 2,569,053, dated Dec. 21, 2010.

Canadian Office Action for related Canadian Application No. 2,569,053, dated May 28, 2012.

Chinese Second Office Action for related Chinese Application No. 200480043308.9, dated Apr. 18, 2011.

Office Action issued by the Canadian Intellectual Property Office from corresponding application No. 2,569,053 dated Jun. 26, 2013.

Office Action issued by the European Patent Office from corresponding application No. 04821783.0-1808 dated Mar. 5, 2013.

European Office Action for related European Application No. 04821783.0, dated Sep. 27, 2013.

* cited by examiner

ANTI-ICING SYSTEM FOR RADOMES

GOVERNMENT LICENSE RIGHTS

The U.S. Government has a paid-up license in this invention and the right in limited circumstances to require the patent owner to license others on reasonable terms as provided for by the terms of Contract No. N00019-93-C-0006 awarded by NAVAIR.

TECHNICAL FIELD

The present invention relates generally to the field of anti-icing systems and relates particularly to anti-icing systems for thin materials.

DESCRIPTION OF THE PRIOR ART

FIG. 1 shows a forward portion of an aircraft 11 having radar system components 13 mounted in the nose section of aircraft 11. Components 13 are protected from impinging air and debris by a radome 15, which is removable for accessing components 13. During flight, aircraft 11 will typically encounter low ambient air temperatures and moisture, the combination of which may cause ice to form on radome 15, resulting in a reduction in the operational effectiveness of components 13.

Ice management for a radar radome, such as radome 15, is a unique endeavor, in that radomes are typically made of materials that do not interfere with the radar operation, such as one or more types of plastics. To prevent ice accumulation or to eliminate accumulated ice, electro-thermal heating elements 17 embedded in radome 15, as shown in FIG. 2, are used to heat at least the outer surface of radome 15. Elements 17 are located within radome 15 with an appropriate spacing as to not interfere with the radar operation and may be configured in other, more intricate configurations.

During icing conditions, electrical power is supplied to elements 17, causing the temperature of elements 17 to increase, which warms the material adjacent elements 17. The amount of power supplied must be carefully controlled, however, as application of too much power can degrade and even destroy the material of radome 15. On the other hand, application of insufficient power will allow radome 15 to accumulate ice and render the radar less effective.

Prior-art ice management systems have applied varying power to elements 17 using devices for varying the voltage supplied to elements 17. While the variable-voltage systems are effective, they are expensive, increasing the cost of the aircraft. In addition, the variable-voltage systems tend to be relatively heavy and bulky, limiting the number of applications in which these systems can effectively be deployed.

SUMMARY OF THE INVENTION

It is one objective of the present invention to provide an ice management system for a structure, such as a radome exposed to atmospheric conditions, in which the system controls the operation of heating elements carried by at least a portion of the structure according to a selected duty cycle that defines time intervals of application of electrical power to the heating elements.

It is another objective of the present invention to provide an ice management system that selects a duty cycle based at least partially on ambient conditions, such as air temperature and air velocity, near the structure.

It is yet another objective of the present invention to provide an ice management system that selects a duty cycle based at least partially on a measured temperature of the heated portion of the structure.

The above objects are achieved by providing an ice protection system for a structure, the system having at least one electro-thermal heating element carried by the structure and a controller for selectively controlling the operation of each heating element. The controller operates each heating element according to a selected duty cycle defined by a pattern of time intervals, the controller selecting the duty cycle at least partially in response to measurements of ambient conditions about the structure. The controller may additionally or alternatively select the duty cycle at least partially in response to the temperature of the heated portion of the structure.

The present invention provides an ice management system with, many advantages, including: (1) scheduling of the duty-cycle power control with OAT and airspeed; (2) scheduling the adjustable control-temperature band with OAT and airspeed; (3) adaptive power control to compensate for ambient conditions; (4) light weight and small size, which allows for use on, e.g., unmanned aerial vehicles and cruise missiles; (5) relatively low expense; and (6) a system particularly suited for use with thin materials, such as radomes.

Additional objectives, features, and advantages will be apparent in the written description that follows.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

The present invention represents the discovery that an ice management system having heating elements may be operated according to a duty-cycle control scheme to heat a structure. The duty cycle is selected by a controller based on measurements of one or more ambient conditions, such as outside air temperature (OAT) and airspeed. The duty cycle may be additionally or alternatively selected based on measurements of the temperature and rates of temperature increase of heated portions of the structure.

A duty cycle comprises a pattern of "on" and "off" commands, each command lasting for a selected number of time intervals. The duty cycle time interval, or frame, may be any appropriate time interval, though the interval must be small enough to achieve a smooth heat exchange to the surrounding structure. Each duty cycle for a given application preferably uses the same base time interval, though the interval size, and resulting frame rate, may be changed as desired.

The present invention is particularly suited for use as an anti-icing system for structures formed of thin materials. An example of such a structure is a radome, such as radome 15, which is required to be thin for ensuring limited interference with transmission of electromagnetic radiation through the radome. Structures may also be required to be thin for weight considerations, such as structures carried on an aircraft. It is usually desirable to maintain a certain level of heat within a thin structure to prevent ice from initially forming thereon, since these structures generally cannot be heated enough to shed ice. An additional consideration is that the colder a thin structure is, the easier it is to damage with overheating. Though the present invention is described in reference to radomes for airborne radar systems, the invention is also applicable to radomes for ground- or sea-based radar systems and to any other structure having electro-thermal heating elements used for ice protection.

Figure 1:
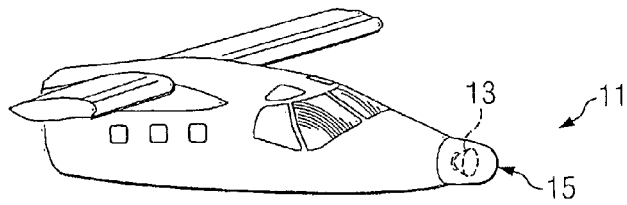
FIG. 1 is a perspective view of a front portion of a prior-art aircraft having a radar system covered by a radome.
Figure 2:
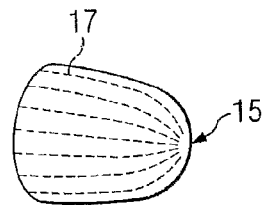
FIG. 2 is a perspective view of the prior-art radome of FIG. 1 showing heating elements embedded in the radome.
Figure 3:
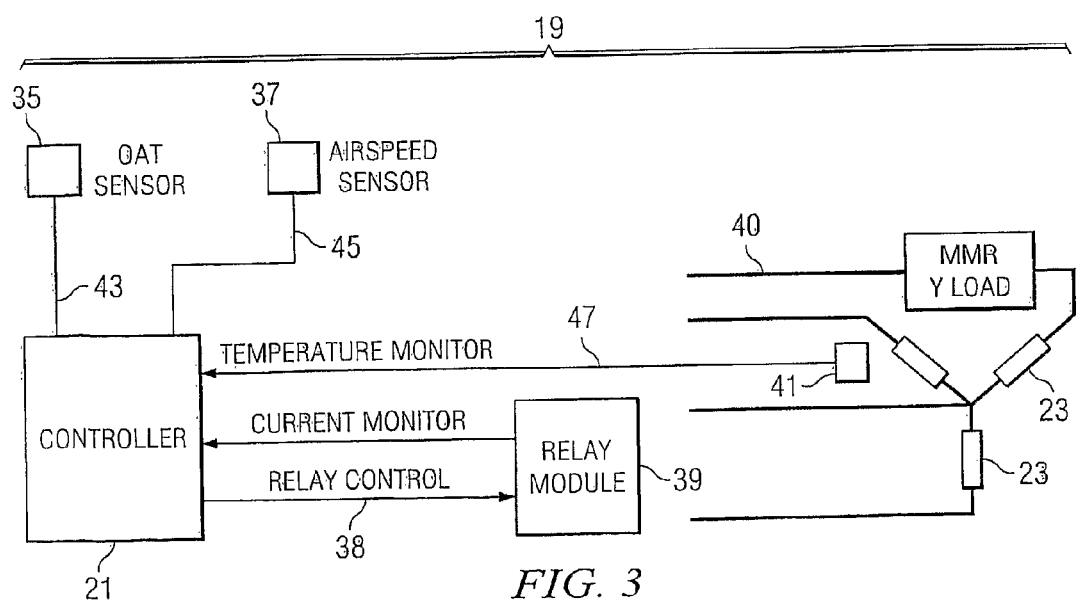
FIG. 3 is a diagram of an ice management system according to the invention.
Figure 4:
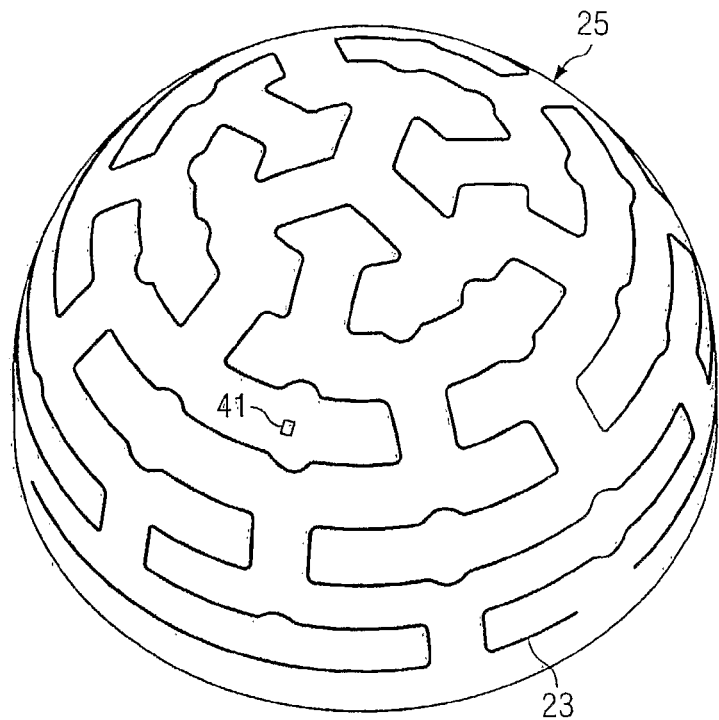
FIG. 4 is a perspective view of a radome according to the invention and showing a particular configuration of heating elements.
Figure 5:
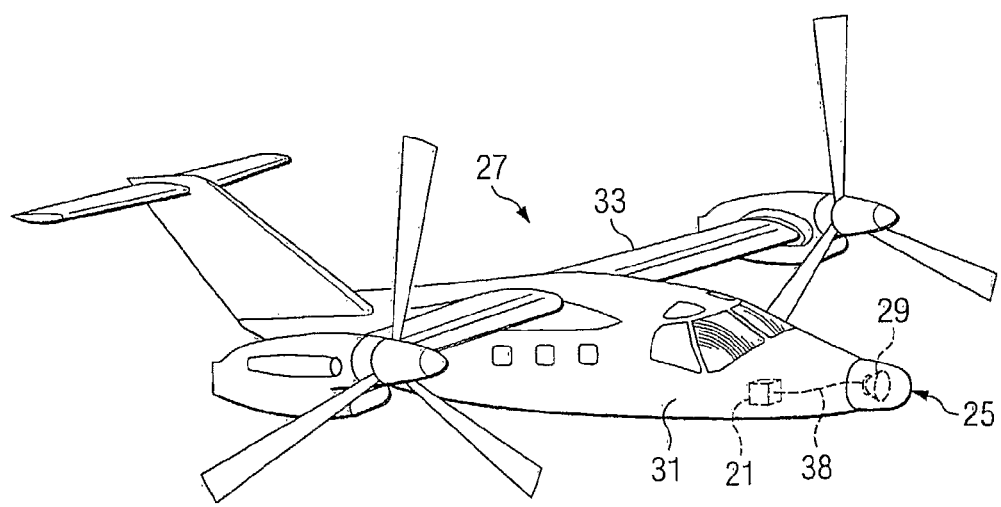
FIG. 5 is a perspective view of a front portion of an aircraft according to the invention, the ice management system of FIG. 3 being installed on the aircraft.

Referring to FIGS. 3 through 5, FIG. 3 shows a block diagram of an anti-icing system 19 according to the invention. System 19 comprises a controller 21, or control module, for operating heating elements 23 embedded in a radome 25, which is depicted in FIG. 4. As shown in FIG. 5, radome 25 is mounted on an aircraft 27 for enclosing components 29 of a radar system carried by aircraft 29. Aircraft 27 has a fuselage 31 and wings 33 for producing lift.

Referring again to FIG. 3, aircraft 27 carries a sensor 35 for sensing outside air temperature (OAT) and a sensor 37 for sensing the speed of air passing over the radome. Controller 21 selectively switches through cable 38 a relay module 39 for controlling the flow of electrical power through supply lines 40 to heating elements 23. At least one sensor 41 is embedded in radome 25 for sensing the temperature of heated portions of radome 25. Sensor 41 is shown in an example position on radome 25 in FIG. 4, though sensor 41 is typically located within a very close distance to heating elements 23, such as, for example, a few thousandths of an inch. Though only one embedded sensor 41 is shown, radome 25 will preferably be formed to have a plurality of sensors 41 for sensing the temperature of radome 25 throughout a large surface area.

Output from sensors 35, 37 is supplied to an embedded computer in controller 21 through cables 43, 45, respectively. The computer uses a lookup table to ascertain the appropriate duty cycle of heating time for that OAT and airspeed combination, and controller 21 then applies that duty cycle until a different duty cycle is selected or operation of elements 23 is terminated. Each embedded temperature sensor 41 is used as a feedback element for the temperature of radome 25, and the output from sensor 41 is supplied to controller 21 through cable 47. It is preferred that the output from OAT sensor 35 be filtered to show the lowest peak temperature in a given time period, preventing system 19 from "chasing" a constantly changing OAT.

Figure 6A:
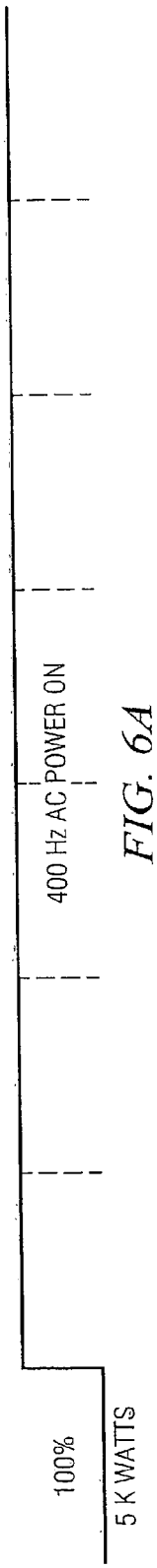
FIGS. 6A through 6D are graphs showing examples of duty cycles according to the invention and used by the system of FIG. 3.
Figure 6B:
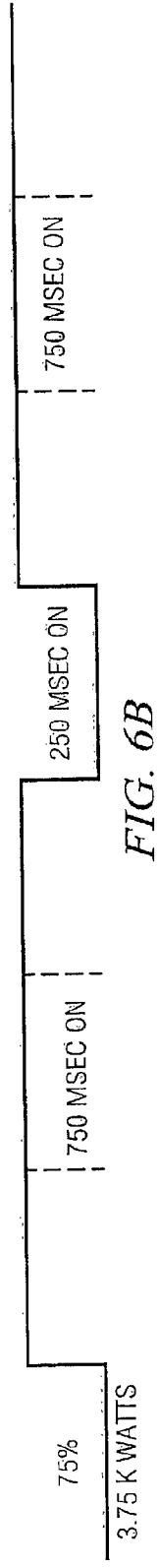
Figure 6C:
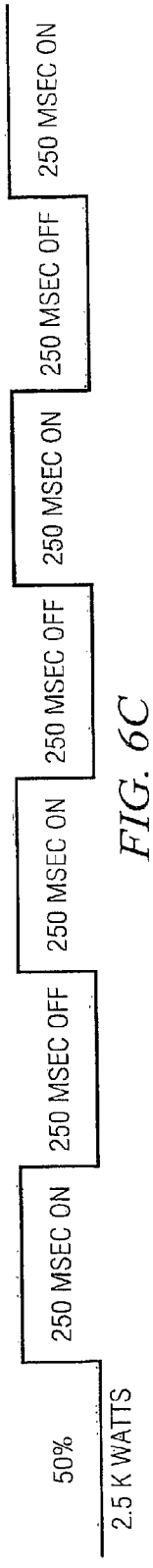

FIGS. 6A through 6D show example duty cycles constructed using a 250-millisecond interval (4 Hertz). For example, if the appropriate duty cycle is 100%, which is shown in FIG. 6A, controller 21 will signal relay module 39 to continuously supply electrical power to heating elements 23 during all time intervals (FIG. 4) until system 19 is switched off or until a new duty cycle is selected. This provides, in the example shown, a total power of 5,000 Watts to heating elements 23. If a 50% duty cycle, as shown in FIG. 6C, is selected, controller 21 will signal relay module 39 to provide power in an alternating pattern of 250 milliseconds "on," when power is supplied to heating elements 23, and 250 milliseconds "off," when power is not supplied to elements 23. This results in electrical power being supplied to elements 23 for 50% of the operational time, which also equates to 50% of the total power, or 2,500 Watts. All duty cycles are derived from the base interval, and this base interval may be any appropriate value as determined for the particular application.

Figure 6D:
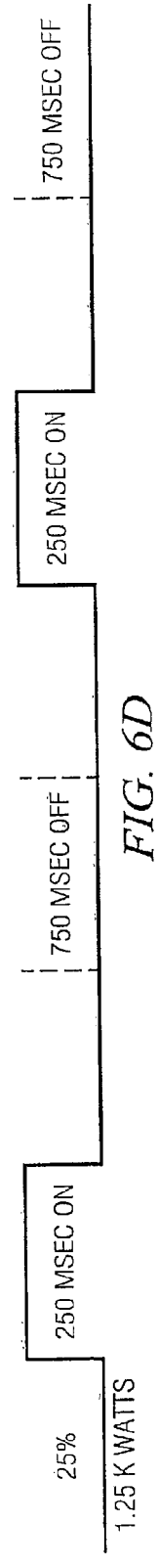

For any interval, example duty cycles having the desired amount of power are constructed as follows:
25%—one interval on, three intervals off, as shown in FIG. 6D
33%—one interval on, two intervals off
50%—one interval on, one interval off
66%—two intervals on, one interval off
75%—three intervals on, one interval off, as shown in FIG. 6B
80%—four intervals on, one interval off These are examples, in that a duty cycle having a desired power level may be constructed by combining "on" and "off" intervals in a combination using the formula:

$$(\text{number of "on" intervals})/(\text{total number of "on" and "off" intervals}) = \% \text{ power}$$

For example, a duty cycle having 3 intervals on and two intervals off is calculated as providing 60% of the total power:

$$(3 \text{ "on" intervals})/(3 \text{ "on" intervals} + 2 \text{ "off" intervals}) = 3/5 = 60\%$$

Figure 7:
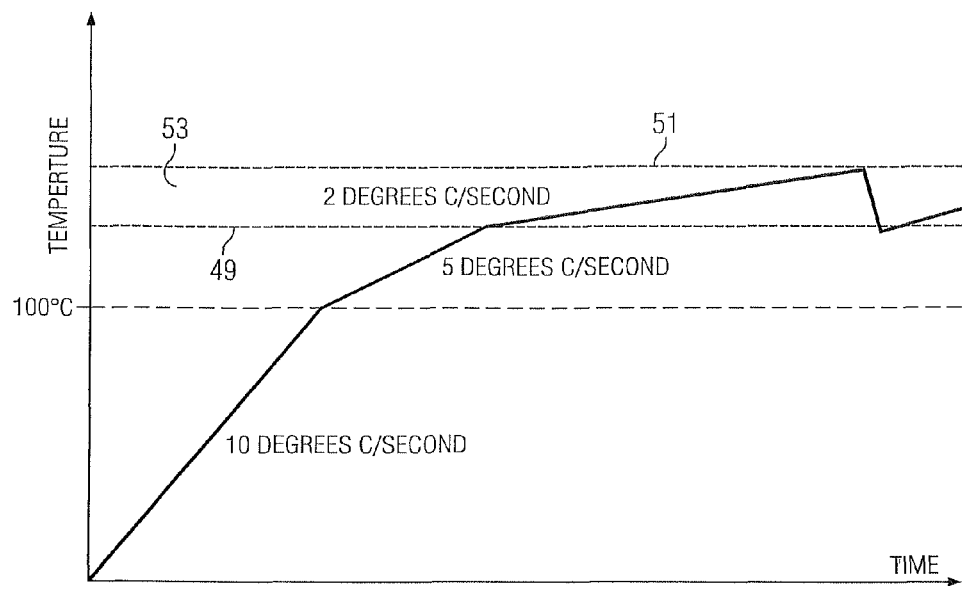
FIG. 7 is a graph of time vs. temperature for an example heating rate schedule according to the invention and used by the system of FIG. 3.
Figure 8:
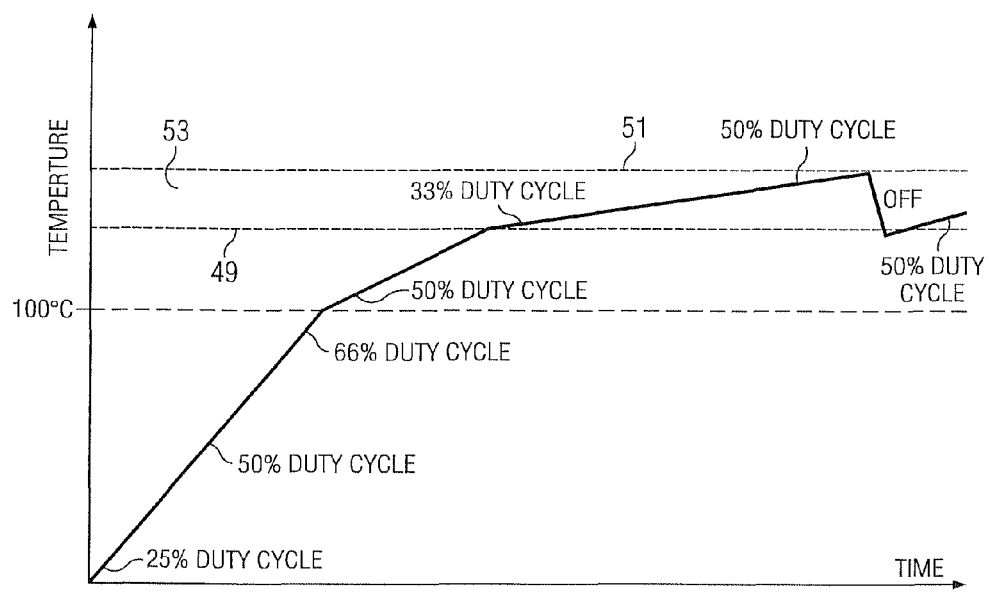
FIG. 8 is a graph of time vs. temperature showing the combination of duty cycles used to achieve the heating rates shown in FIG. 7.

Referring to FIGS. 7 and 8, in addition to duty cycles being scheduled for a given OAT and airspeed, there is also an associated "on" temperature 49 and "off" temperature 51 of radome 25 for each given airspeed and OAT regime. Temperatures 49, 51, also known as the lower and upper control temperatures, respectively, define a control temperature band 53 between temperatures 49, 51. Temperatures 49, 51, and therefore band 53, are adjusted higher or lower as airspeed and OAT change. While system 19 (FIG. 3) is operating, the selected duty cycle would be applied until upper control temperature 49 is reached, then power to heating elements 23 is switched off. Radome 25 then cools until lower control temperature 51 is reached, at which point power is reapplied to elements 23 using the previously selected duty cycle. Radome 25 is heated until upper control temperature 49 is reached again. An appropriate duty cycle and an appropriate control temperature band 53 are associated with all OAT and airspeed combinations, and as the airspeed increases and the temperature conduction characteristics of radome 25 changes, the control temperatures may be adjusted by system 19 in order to maintain effective anti-ice operation.

The optimum situation is for the radome to have a constant temperature within control temperature band 53. However, ambient conditions may change during use of radome 25, requiring application of varying amounts of power to keep ice from forming on radome 25. As mentioned above, the objective of the duty cycle control is to deliver the appropriate amount of power to radome 15 for that particular flight regime. System 19 is adaptive, in that controller 21 monitors the rate of heating of radome 25 using temperature sensor 41, and if a desired rate of heating is not achieved over a given time interval due to conditions such as low generator voltage or water droplets on radome 25, controller 21 will gradually increase the duty cycle setting to maintain the expected rate of heating up to an overriding maximum rate determined for the particular application. If the rate of heating is too rapid, or if overshoot of upper control temperature 51 exists, then controller 21 gradually decreases the duty cycle setting to bring the rate of heating to the desired rate.

FIG. 7 shows an example schedule for heating radome 25, in which the rate of heating is scheduled against the temperature of radome 25, as sensed by sensor 41. The heating rates shows in the graph are:

Below 100° C.
  If the temperature of radome 25 is below 100° C., the desired heating rate is 10° C. per second. System 19 starts operation of heating elements 23 at the minimum duty cycle and updates the selection of duty cycle once per second to achieve the desired rate of increase of 10° C. per second.

Between 100° C. and lower control temperature 49
  If the temperature of radome 25 is between 100° C. and lower control temperature 49, the desired heating rate is 5° C. per second. System 19 updates the selection of duty cycle once per second to achieve the desired rate of increase of 5° C. per second.

Within control temperature band 53
  If the temperature of radome 25 is within control temperature band 53, the desired heating rate is 2° C. per second. System 19 updates the selection of duty cycle once per second to achieve the desired rate of increase of 2° C. per second. System 19 also monitors the upper control temperature at 4 Hz.

When upper control temperature 51 is reached, electrical power to heating elements 23 is removed until lower control temperature 49 is reached, then the last known good duty-cycle setting is applied and monitored for the same 2° C. increase per second.

FIG. 8 is an example of a combination of duty cycles used to heat radome 25 according to the heating rates shown in FIG. 7. In the example shown, to obtain the desired rate of increase of 10° C. per second (as in the example shown in FIG. 7) up to 100° C., controller 21 uses a progression of 25%, 50%, and 66% duty cycles. Afterward, a 50% duty cycle is selected until lower control temperature 49 is reached, at which time a combination of a 33% duty cycle and a 50% duty cycle is used to heat radome 25 to upper control temperature 51. Controller 21 then switches off power to heating elements 23 until lower control temperature 49 is reached, when controller 21 reapplies the last good power setting of a 50% duty cycle. In a particular application, controller 21 may select any of the available duty cycles and in any combination or sequence. The duty cycles selected by controller 21 for any temperature range will be based on the factors described above, including ambient conditions and heating rate of radome 25.

Alternatively, a combination of duty cycles required to achieve a desired heating rate for a particular region may be determined through experimentation. In the example of radome 25, this is especially true for the initial region below 100° C. For example, it has been determined from experimental data that one appropriate method of heating radome 25 from the initial temperature to 100° C. is to apply power using the lowest available duty cycle, and then increase the duty cycle every 30 seconds until radome 25 reaches 100° C. Though system 19 monitors for excessive rates of heating, such a progressive schedule has been found to heat radome in an effective manner without exceeding the overriding rate of 10° C. per second.

In addition, a predictor function may be implemented in controller 21 to prevent overshoot of upper control temperature 51 or undershoot of control temperatures 49 when system 19 is operating within control temperature band 53, such as shown in FIGS. 7 and 8. For every time interval in a duty cycle, controller 21 makes a prediction of the temperature of radome 25 at the end of the next time interval to determine whether to apply the "on" or "off" condition that is next in the sequence for that duty cycle. Using the output from sensors 41, controller 21 logs (1) the current temperature of radome 25, (2) the rate of change of temperature of radome 25 during the current time Interval, and (3) the rate of change of temperature of radome 25 during the most recent time interval in which the "on" or "off" condition was the opposite of the condition in the current time interval. Controller 21 then uses these data to calculate the predicted temperature at the end of the next time interval, allowing for a prediction of undershoot or overshoot due to operation according to the condition called for in the next time interval of the duty cycle.

Figure 9:
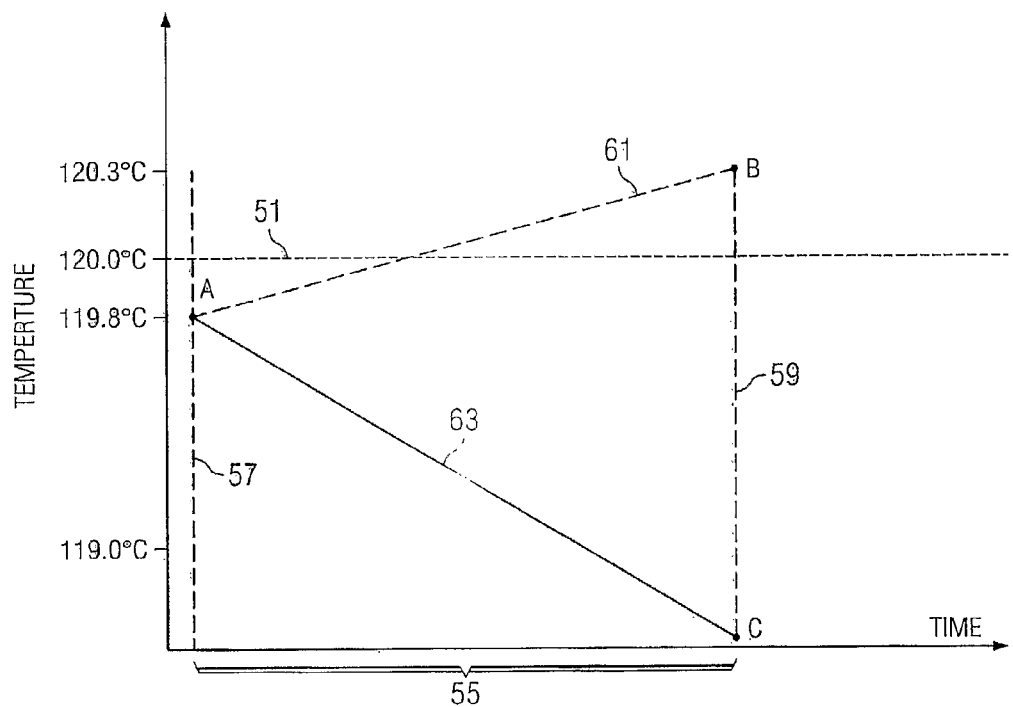
FIG. 9 is a graph illustrating the use of a predictor function implemented in the system of the invention and acting to prevent overshoot of an upper control temperature.
Figure 10:
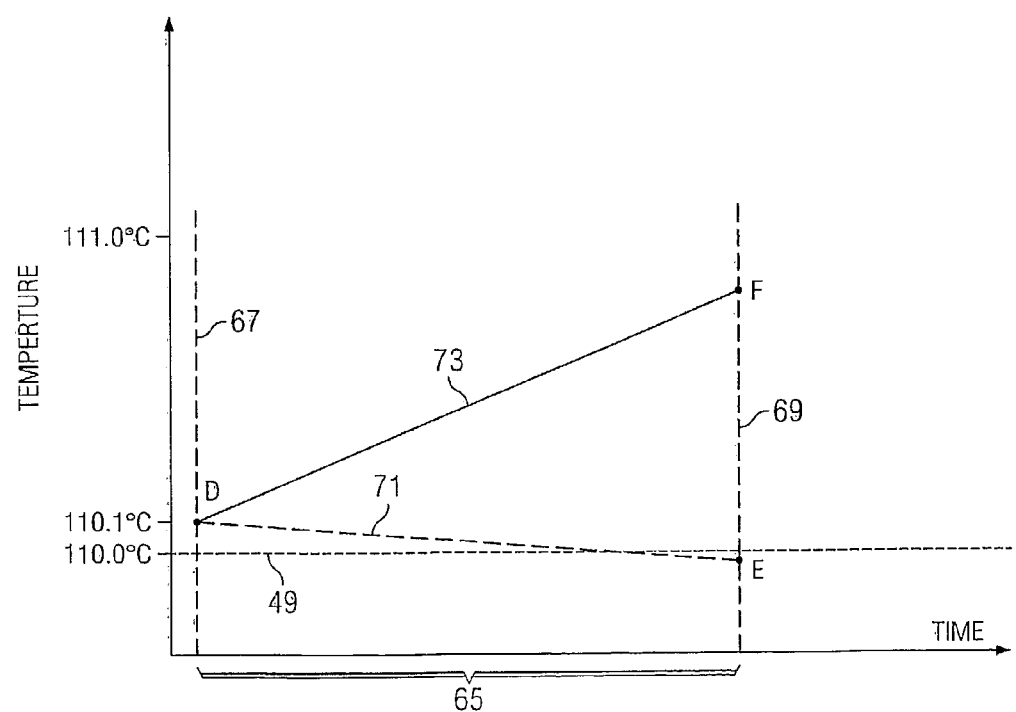
FIG. 10 is a graph illustrating the use of a predictor function implemented in the system of the invention and acting to prevent undershoot of a lower control temperature.

FIGS. 9 and 10 illustrate examples of use of the predictor function of the present invention. In FIG. 9, for example, the temperature of radome 25 near the end of a current time interval is 119.8° C., which is plotted on the graph at point A. If the next interval 55, bounded by dotted lines 57, 59, is an "on" interval in the current duty cycle, controller 21 calculates a predicted temperature for the end of the next interval by using the current temperature and the rate of change of temperature logged during the most recent "on" interval. If this rate of change of temperature was +2° C. per second, then that rate over a 250-millisecond time interval would cause a 0.5° C. rise in the temperature of radome 25. Thus, the predicted temperature for the end of the next interval is 120.3° C., which is shown on the graph at point B. This temperature would overshoot upper control temperature 51 approximately halfway through the time interval, as shown by sloping line 61. To avoid the overshoot, controller 21 then alters the application of the current duty cycle, in that the next time interval is changed from an "on" interval to an "off" interval, proactively preventing the temperature of radome 25 from overshooting upper control temperature 51. The actual temperature of radome 25 falls during interval 55, as shown by sloping line 63, to a lower temperature, such as the temperature shown at point C. The temperature of radome 25 is then logged for prediction of the temperature at the end of the next interval, and the rate of change during interval 55 is logged for use in predictions for subsequent "off" time intervals. In the preferred embodiment, when an overshoot is predicted, controller 21 ends the application of the duty cycle until the temperature of radome 25 falls to near lower control temperature 49. When the predictor function predicts an undershoot, as described below, controller 21 reapplies the last duty cycle to prevent the undershoot and maintain the temperature of radome 25 within control band 53.

As shown in FIG. 10, a similar prediction and altering of power delivery is done for an "off" interval to predict undershoot of lower control temperature 49. For example, the temperature of radome 25 near the end of a current time interval is 110.1° C., which is plotted on the graph at point D. If the next interval 65, bounded by dotted lines 67, 69, is an "off" interval in the current duty cycle, controller 21 calculates a predicted temperature for the end of the next interval by using the current temperature and the rate of change of temperature logged during the most recent "off" interval. If this rate of change of temperature was −1° C. per second, then that rate over a 250-millisecond time interval would cause a 0.25° C. decrease in the temperature of radome 25. Thus, the predicted temperature for the end of the next interval is 109.85° C., which is shown on the graph at point E. This temperature would undershoot lower control temperature 49 during the time interval, as shown by sloping line 71. To avoid the undershoot, controller 21 then alters the application of the current duty cycle, in that the next time interval is changed from an "off" interval to an "on" interval, proactively preventing the temperature of radome 25 from undershooting lower control temperature 49. The actual temperature of radome 25 rises during interval 65, as shown by sloping line 73, to a higher temperature, such as the temperature shown at point F. The temperature of radome 25 is then logged for prediction of the temperature at the end of the next interval, and the rate of change during interval 65 is logged for use in predictions for subsequent "on" time intervals.

Figure 11:
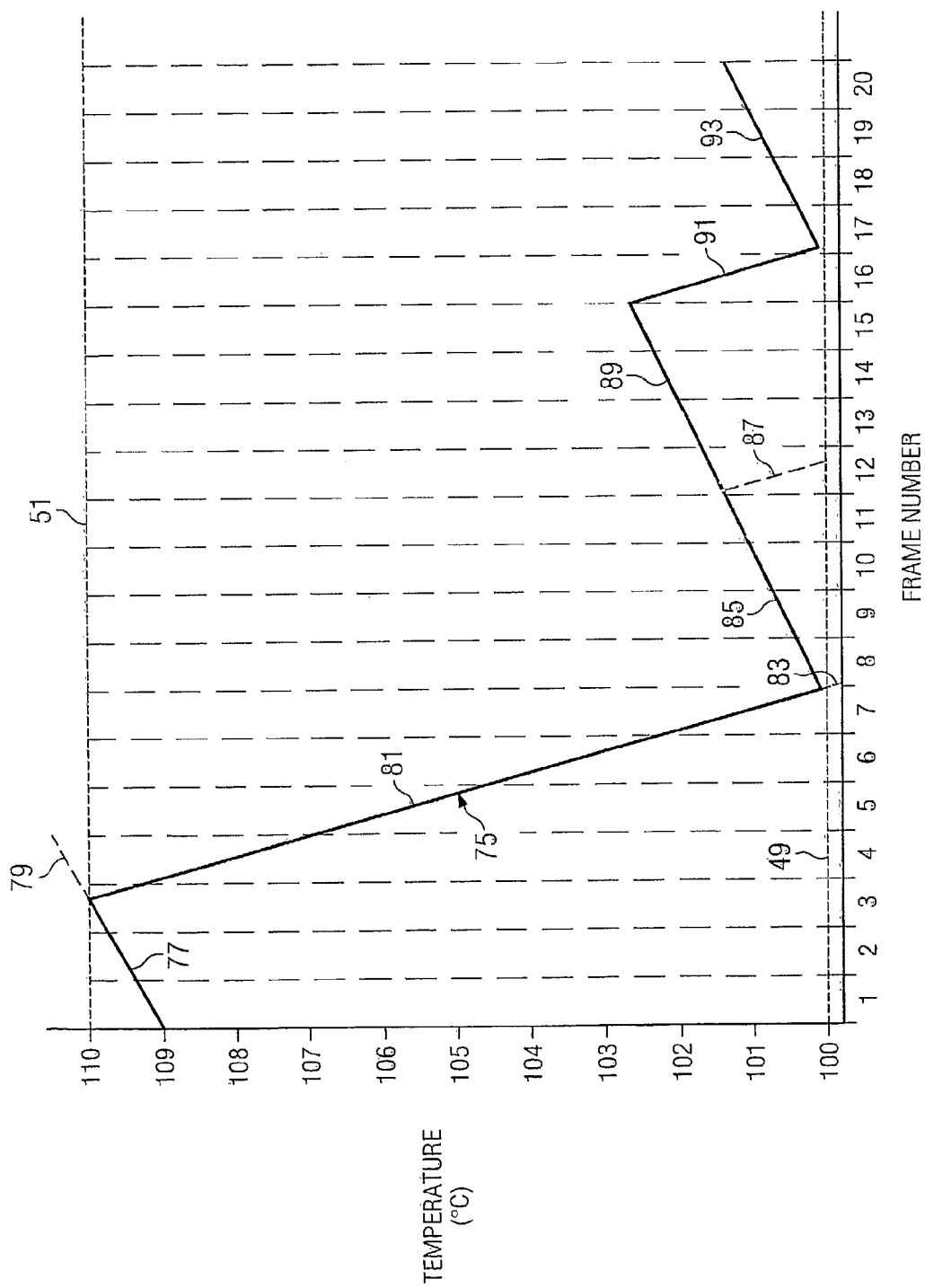
FIG. 11 is a graph showing the use over time of duty-cycle control and a predictor function to maintain a temperature of a radome within a control-temperature band.

FIG. 11 illustrates an example track 75 of temperature when duty-cycle control is combined with the predictor functions described above. In the example shown, lower control temperature 49 is 100° C., upper control temperature 51 is 110° C., and a 80% duty cycle is being used. In addition, the example uses 125 millisecond time intervals, a heating rate of +2.7° C. per second, and a cooling rate of −24° C. per second.

In time intervals 1-4, the 80% duty cycle calls for application of power to heating elements 23 (FIG. 3), these being the "on" intervals of the duty cycle. Line 77 of track 75 shows the heating of radome 25 in intervals 1-3 while power is supplied to heating elements 23. During all time intervals while system 19 is operating, controller 21 predicts the temperature at the end of the next interval. In the example illustrated, the application of power in interval 4 would result in an overshoot of upper control temperature 51, as shown by broken line 79. The predictor function of controller 21 predicts this overshoot, as described above, and controller 21 turns off power to heating elements 23.

When heating elements 23 are not operating, the temperature of radome 25 falls, as shown by line 81. When the temperature in the next interval is predicted to undershoot lower control temperature 49, as shown in interval 8 by broken line 83, controller 21 reapplies power according to the previously selected duty cycle. In the example, the temperature of radome 25 rises, as shown by line 85, as power is applied through intervals 8-11 according to the 80% duty cycle. The following interval is an "off" interval in the duty cycle, but controller 21 predicts that the cooling rate of radome 25 would result in an undershoot of lower control temperature 49 in interval 12, shown by broken line 87. To prevent the undershoot, controller 21 restarts application of the duty cycle sequence in interval 12, applying power through 4 intervals, as shown by line 89. This is followed by an "off" interval in interval 16, shown by line 91, and the duty cycle sequence restarts in frame 17, shown by line 93.

Since the instantaneous available electrical power is too much for the application, the duty cycle control is an economical way of controlling the electrical power supplied to radome 25 without requiring an expensive variable-voltage power supply. The fine power control is essential to preclude overshooting upper control temperature 51 due to thermal inertia. In addition, the adjustment of control temperature band 53 is essential due to the changing heat exchange characteristics of radome 25 with different airspeeds. Also, the adaptive power control is needed to compensate for fluctuations in generator power and due to the presence or absence water droplets on radome 25. The use of a predictor function also acts to assist in maintaining the temperature within band 53. The combination of all of these, scheduled for airspeed and OAT, allows for an effective anti-ice system 19 for radomes.

The present invention provides an ice management system with many advantages, including: (1) scheduling of the duty-cycle power control with OAT and airspeed; (2) scheduling the adjustable control-temperature band with OAT and airspeed; (3) adaptive power control to compensate for ambient conditions; (4) light weight and small size, which allows for use on, e.g., unmanned aerial vehicles and cruise missiles; (5) relatively low expense; and (6) a system particularly suited for use with thin materials, such as radomes.

While this invention has been described with reference to an illustrative embodiment, this description is not intended to be construed in a limiting sense. Various modifications and other embodiments of the invention will be apparent to persons skilled in the art upon reference to the description.

The invention claimed is:

1. An ice management system for a structure, the system comprising:
    at least one electro-thermal heating element carried by the structure for heating a heated portion of the structure; and
    a controller for selectively controlling the operation of each heating element, the controller being configured to selectively adjust a control temperature band, the control temperature band comprising an upper control temperature and a lower control temperature;
    wherein the controller is further configured to repeatedly adjust the upper control temperature and the lower control temperature of the control temperature band at least partially in response to sensed changes of an air temperature near the structure and a velocity of air passing over the structure;
    wherein the controller is further configured to operate each heating element according to a selected duty cycle defined by a pattern of time intervals;
    wherein, for each time interval in the duty cycle, the controller is further configured to predict the temperature of the heated portion of the structure at the end of a next time interval to determine whether to apply an on or off condition during the next time interval, thereby operating each heating element so as to obtain and maintain a temperature of the heated portion of the structure approximately within the control temperature band; and
    wherein the prediction of the temperature of the heated portion of the structure at the end of the next time interval is based on an expected rate of change of a temperature of the structure were the at least one electro-thermal heating element to be operated in the subsequent time interval.

2. The system according to claim 1, wherein each time interval is a pre-determined length.

3. The system according to claim 1, wherein the time intervals are of equal length.

4. The system according to claim 1, wherein each time interval is about 250 milliseconds.

5. The system according to claim 1, wherein the controller operates to adjust the duty cycle according to at least one measurement of the air temperature near the structure, and the velocity of air passing over the structure.

6. The system according to claim 1, further comprising:
    at least one temperature sensor carried by the structure for sensing a temperature of a portion of the heated portion;
    wherein the controller selects the duty cycle at least partially in response to an output of the at least one temperature sensor.

7. The system according to claim 1, further comprising:
at least one ice detection sensor;
wherein the controller selects the duty cycle at least partially in response to an output of the at least one ice detection sensor.

8. The system according to claim 1, wherein the controller selects the duty cycle so as to prevent the temperature of the heated portion of the structure from increasing faster than a predetermined maximum rate.

9. The system according to claim 1, wherein the structure is a thin material.

10. The system according to claim 1, wherein the structure is a radome adapted for enclosing a radar system.

11. The system according to claim 1, wherein each heating element is configured to allow transmission of at least a selected frequency of electromagnetic energy through the structure.

12. An ice management system for a radome having at least one surface exposed to atmospheric conditions, the system comprising:
at least one electro-thermal heating element carried by the radome for heating an adjacent portion of the exposed surface; and
a controller for selectively controlling the operation of each heating element, the controller being configured to selectively adjust a control temperature band, the control temperature band comprising an upper control temperature and a lower control temperature;
wherein the controller is further configured to repeatedly adjust the upper control temperature and the lower control temperature of the control temperature band at least partially in response to sensed changes of an air temperature near the structure and a velocity of air passing over the structure;
wherein the controller is further configured to operate each heating element according to a selected duty cycle defined by a pattern of time intervals; and
wherein, for each time interval in the duty cycle, the controller is further configured to predict the temperature of the heated portion of the structure at the end of a next time interval to determine whether to apply an on or off condition during the next time interval, thereby operating each heating element so as to obtain and maintain a temperature of the heated portion of the structure approximately within the control temperature band; and
wherein the prediction of the temperature of the heated portion of the structure at the end of the next time interval is based on an expected rate of change of a temperature of the structure were the at least one electro-thermal heating element to be operated in the subsequent time interval.

13. The system according to claim 12, wherein each time interval has a pre-determined length.

14. The system according to claim 12, wherein the time intervals are of equal length.

15. The system according to claim 12, wherein each time interval is about 250 milliseconds.

16. The system according to claim 12, wherein the controller operates to adjust the duty cycle according to at least one measurement of the air temperature near the structure, and the velocity of air passing over the structure.

17. The system according to claim 12, further comprising:
at least one temperature sensor carried by the radome for sensing a temperature of a portion of the radome;
wherein the controller selects the duty cycle at least partially in response to an output of the at least one temperature sensor.

18. The system according to claim 12, further comprising:
at least one ice detection sensor;
wherein the controller selects the duty cycle at least partially in response to an output of the at least one ice detection sensor.

19. The system according to claim 12, wherein the controller selects the duty cycle so as to prevent the temperature of the heated portion of the structure from increasing faster than a predetermined maximum rate.

20. The system according to claim 12, wherein each heating element is configured to allow transmission of at least a selected frequency of electromagnetic energy through the radome.

21. The system according to claim 12, wherein the radome is constructed of a thin material.

22. An aircraft, comprising:
a fuselage;
a means for producing lift;
a radar system;
a radome for enclosing at least a portion of the radar system;
at least one electro-thermal heating element carried by the radome for heating an adjacent portion of the radome;
a controller for selectively controlling the operation of each heating element, the controller being configured to selectively adjust a control temperature band, the control temperature band comprising an upper control temperature and a lower control temperature;
wherein the controller is further configured to repeatedly adjust the upper control temperature and the lower control temperature of the control temperature band at least partially in response to sensed changes of an air temperature near the structure and a velocity of air passing over the structure; and
wherein the controller is further configured to operate each heating element according to a selected duty cycle defined by a pattern of time intervals;
wherein, for each time interval in the duty cycle, the controller is further configured to predict the temperature of the heated portion of the structure at the end of a next time interval to determine whether to apply an on or off condition during the next time interval, thereby operating each heating element so as to obtain and maintain a temperature of the heated portion of the structure approximately within the control temperature band; and
wherein the prediction of the temperature of the heated portion of the structure at the end of the next time interval is based on an expected rate of change of a temperature of the structure were the at least one electro-thermal heating element to be operated in the subsequent time interval.

23. The system according to claim 22, wherein the controller operates to adjust the duty cycle according to at least one measurement of the air temperature near the structure, and the velocity of air passing over the structure.

24. The system according to claim 22, further comprising:
at least one temperature sensor carried by the radome for sensing a temperature of a portion of the radome;
wherein the controller selects the duty cycle at least partially in response to an output of the at least one temperature sensor.

25. The system according to claim 22, wherein the controller selects the duty cycle so as to prevent the temperature of the heated portion of the structure from increasing faster than a predetermined maximum rate.

26. The system according to claim 22, wherein each heating element is configured to allow transmission of at least a selected frequency of electromagnetic energy through the radome.

27. The system according to claim 22, wherein the radome is constructed of a thin material.

28. A method for controlling a heater carried on a structure for managing ice formation on the structure, the method comprising:

sensing an air temperature near the structure and a velocity of air passing over the structure;

automatically and repeatedly adjusting an upper control temperature and a lower control temperature of a control temperature band based upon changes in the sensed air temperature near the structure and the velocity of air passing over the structure, the control temperature band representing a desired temperature range of the structure;

automatically selecting a duty cycle for operation of the heater, the duty cycle being defined by a pattern of time intervals, in which electrical power is supplied or not supplied to the heater for the duration of each time interval within the pattern, the selection of the duty cycle being at least partially in response to the sensed air temperature near the structure and the velocity of air passing over the structure; and for each time interval in the duty cycle, automatically predicting the temperature of the heated portion of the structure at the end of a next time interval to determine whether to apply an on or off condition during the next time interval, thereby operating the heater so that a temperature of the structure approximately resides below the upper control temperature and above the lower control temperature; and wherein the predicting of the temperature of the heated portion of the structure at the end of the next time interval is based on an expected rate of change of a temperature of the structure were the heater to be operated in the subsequent time interval.

29. The method according to claim 28, wherein each time interval is a pre-determined length.

30. The method according to claim 28, wherein the time intervals are of equal length.

31. The method according to claim 28, further comprising:

sensing a temperature of at least a portion of the structure; and wherein the selection of the duty cycle is at least partially in response to the sensed temperature.

32. The method according to claim 28, wherein the duty cycle is selected so as to prevent the temperature of the structure from increasing faster than a predetermined maximum rate.

33. The method according to claim 32, wherein the heater is automatically switched off when the temperature of the structure reaches an upper limit of the control temperature band.

34. The method according to claim 32, wherein the heater is automatically switched on, with a selected duty cycle, when the temperature of the structure reaches a lower limit of the control temperature band.

35. A method for controlling a heater carried on a structure, the method comprising:

operating the heater according to a selected duty cycle, the duty cycle being defined by a pattern of time intervals, electrical power being supplied or not supplied to the heater for the duration of each time interval within the pattern;

for each time interval in the duty cycle, calculating a predicted temperature of the structure near an end of the subsequent time interval, the calculation being based on a current temperature measurement of the structure, a measured rate of change of temperature of the structure during a recent time interval so as to provide an expected rate of change of temperature were the heater to be operated in the subsequent time interval according to the duty cycle, and a measured rate of change of temperature of the structure during a recent time interval so as to provide an expected rate of change of temperature were the heater not operated in the subsequent time interval according to the duty cycle; and sensing whether at least one of airspeed and outside air temperature has changed;

adjusting an upper control temperature and a lower control temperature if a change is sensed in at least one of airspeed and outside air temperature;

automatically supplying or not supplying electrical power to the heater in the subsequent time interval in response to the predicted temperature of the structure in order to maintain an actual temperature of the structure between the upper control temperature and lower control temperature;

wherein the structure has at least one surface exposed to atmospheric conditions.

* * * * *